United States Patent [19]

Hommel et al.

[11] 4,305,743
[45] Dec. 15, 1981

[54] METHOD AND SYSTEM FOR QUENCHING, DRYING, AND ELEVATING GLASS COMPOSITIONS

[75] Inventors: Richard O. Hommel, Pittsburgh; Dominick Battistone, Jr., Bridgeville, both of Pa.

[73] Assignee: The O. Hommel Company, Carnegie, Pa.

[21] Appl. No.: 174,622

[22] Filed: Aug. 1, 1980

[51] Int. Cl.³ ............................................. C03B 1/00
[52] U.S. Cl. ......................................... 65/28; 65/19; 65/134; 65/335; 414/165
[58] Field of Search ................. 65/134, 135, 136, 335, 65/19, 28; 414/158, 165

[56] References Cited

U.S. PATENT DOCUMENTS

| | | | |
|---|---|---|---|
| 1,940,945 | 12/1933 | Greene | 414/158 X |
| 3,278,284 | 10/1966 | Van Dolah et al. | 65/19 X |
| 3,912,487 | 10/1975 | Sharanov et al. | 65/19 X |
| 4,046,541 | 9/1977 | Anderson | 65/19 |

Primary Examiner—Arthur D. Kellogg
Attorney, Agent, or Firm—Webb, Burden, Robinson & Webb

[57] ABSTRACT

A method and system for quenching, drying, and elevating glass compositions comprising an incline reciprocating conveyor arranged to receive a stream of molten glass. The reciprocating conveyor has deep side and lower end walls in order to hold a pool of quenching liquid which is constantly replenished. The reciprocating action of the incline conveyor moves the quenched and shattered glass up out of the quenching pool to the higher end of the conveyor where it is drained and then delivered to a second conveyor. The second conveyor preferably comprises a helical vibrating conveyor surrounded by infrared heaters. The infrared heaters can be adjusted to supply just enough heat to the shattered glass on a helical vibrating conveyor surface to provide drying of the glass.

4 Claims, 1 Drawing Figure

U.S. Patent   Dec. 15, 1981   4,305,743
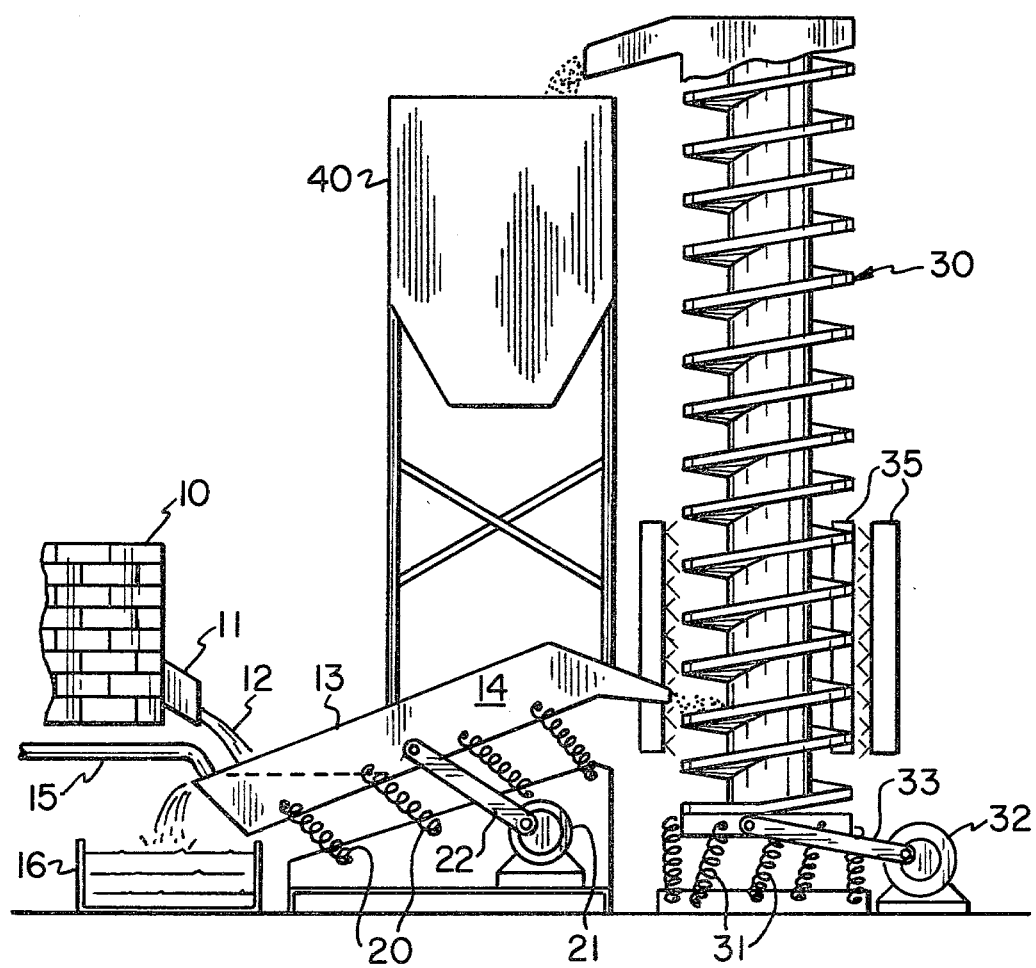

METHOD AND SYSTEM FOR QUENCHING, DRYING, AND ELEVATING GLASS COMPOSITIONS

BACKGROUND

In the manufacture of glazes for ceramics and porcelain enamel coatings for metals, it is often desired to form the raw materials into a frit; that is, a particulate glass-like product. The process involves blending the raw ingredients, melting the ingredients, quenching the melt and drying the quenched and shattered frit. While this patent application is not directly related to the mixing and melting processes, it should be understood that melting involves heating the ingredients until a fairly uniform molten glass is formed.

The principal object of quenching the molten glass as it emerges from the furnace in which it is melted is to make grinding of the solidified glass easier. If the glass is slowly cooled, it forms hard lumps which are difficult to crush or grind. Ideally, the quenched glass or frit comprises a particulate product having microcracks throughout each particle or chunk. It is desirable that the frit be as completely quenched as possible. Poorly quenched frits require much more time and energy to crush and grind (for example, in a ball mill) than well quenched frit. It is also important that the quenching be as uniform as possible. The uniformity of the frit can result in more uniform size of the crushed and milled frit.

Simply pouring the molten glass into a tank of quenching liquid, for example water, does not produce good quenching. The best quenching results from breaking up of the molten glass before or just after it enters the quenching water. Rapid cooling then causes shattering of the glass. A good frit is not only broken (shattered) into small pieces, but is intersected with cracks that makes further reduction in size easier.

A quenched and drained frit can comprise from 5 to 15 percent water. For transporting, batching, and milling, the frit preferably must be dried. Frit is usually shipped in paper bags and often in cardboard drums in which it must be dried.

If the frit is properly quenched using certain prior art methods, it does not contain sufficient heat to quickly self dry. The frit is not removed from the quenching bath until it has lost most of its heat. Then the frit is dried, for example, in a stationary or rotary dryer, which apparatus is energy inefficient. Dryers tend to generate much more heat than is actually needed to drive water off of the frit.

A process for quenching molten glass is described in U.S. Pat. Nos. 2,137,931 and 2,294,828. Drying of chopped glass strands with infrared heat is described in U.S. Pat. No. 4,024,647. Prolonging the cooling of frit by infrared heating on an oscillating conveyor is illustrated in U.S. Pat. No. 3,278,284. Drying porcelain enamel frit in a helical conveyor with hot air is illustrated in U.S. Pat. No. 2,688,807.

There has been a need for an extremely energy efficient system and method for quenching, drying and elevating frits. It is an advantage of this invention to provide such a system and method. The energy efficiency results from producing a well quenched frit that is drained of quenching liquid while it still retains sufficient heat to promote self drying with only the aid of infrared heating.

SUMMARY OF THE INVENTION

Briefly according to this invention, there is provided a system for quenching molten glass, drying the quenched glass and elevating the quenched and dried glass to a storage hopper. The system comprises a reciprocating inclined conveyor having deep side and lower end walls. The system further comprises continuously replenishing the lower end of the conveyor with a quenching liquid. The lower end of the conveyor containing the quenching liquid is positioned to receive a stream of molten glass to be quenched. The system further comprises a second vibrating conveyor onto which the quenched and drained frit is delivered from the reciprocating inclined conveyor. The system further comprises means for irradiating the frit on the second vibrating conveyor with infrared radiation to sufficiently complete the drying of the frit.

A process according to this invention comprises a first step of discharging a stream of molten glass composition and a stream of quenching water directly into a reciprocating inclined conveyor having deep side and lower end walls such that the lower end is overflowing with quenching liquid and the upper end of the conveyor is not submerged. The method comprises a second step of reciprocating the conveyor continuously to agitate the quenching liquid and to move the quenched frit up along the conveyor until it emerges from the quenching liquid where it can be drained. The method further comprises a step for feeding the quenched frit from the inclined reciprocating conveyor to a second vibrating conveyor. The next step comprises irradiating at least a portion of the second vibrating conveyor with infrared radiation sufficient to complete the drying of the quenched frit.

THE DRAWING

The drawing is a schematic diagram illustrating the apparatus comprising the system according to this invention and the apparatus for practicing the method according to this invention.

DESCRIPTION OF THE PREFERRED EMBODIMENT

Referring now to the drawing, there is illustrated a melting furnace or tank 10 made of refractory brick in which the ingredients of the glass composition are melted and homogenized. A refractory spout 11 directs a continuous stream 12 of molten glass from the tank.

An inclined reciprocating conveyor 13 is positioned to receive the molten glass at the lower end thereof. The conveyor has deep side walls 14 and lower end walls so that a bath of quenching liquid, almost always water, can be maintained at the lower end of the conveyor. The quenching water is constantly replenished from a source of cool water and continuously overflows the back end of the conveyor spilling into a reservoir 16. The inclined reciprocating conveyor may have any conventional suspension for such conveyors, for example, springs 20. A motor 21 drives a reciprocating arm 22 attached to the conveyor. The reciprocating movement of the conveyor provides continuous agitation of the water bath at the lower end and constantly moves the bottom of the conveyor relative to the molten glass stream 12. This enables the relatively small (but constantly replenished) quenching bath to provide the desired quenching action. The molten stream of glass cools and shatters in the bath. The reciprocating action of the conveyor further moves the shattered glass or frit up, out of the bath to the higher end of the conveyor where it is removed. Surprisingly the wet frit (granular as it emerges from the bath) is thrown along both under the bath and after it emerges from the bath by the reciprocating action. The bath of water in the lower end of the conveyor does not prevent the granular frit submerged therein from being thrown up along the inclined bottom surface of the conveyor. Water runs back down the inclined surface of the conveyor off the frit at the upper end providing effective draining action.

The drained granular frit is then dumped from the reciprocating conveyor onto a second vibrating and elevating conveyor 30. The elevating conveyor is preferably a vibrating helical plane conveyor. The conveyor is mounted, for example, upon springs 31 and is driven by a motor 32 and reciprocating arm 33. The granular frit dumped from the inclined conveyor is still warm and moist. It has, however, almost sufficient heat to dry itself. It is desirable to mount infrared heaters around the central portion, for example, of the helical conveyor to aid in separating the moisture from the granular frit. Preferably, the infrared heaters 35 are gas heaters and they may be electrical heaters. These are easily controlled to provide just the amount of extra heat required to dry the granular frit and no more.

The helical conveyor may or may not be surrounded with a jacket. If it is enclosed, means for inducing a draft to carry moisture laden air away from the drying frit will be desirable. For example, the hollow central column of the helical conveyor may have holes in the wall thereof which may be used to draw air across the drying frit and up the hollow center column. In this case, a small blower may be mounted at the top to induce the draft and draw moisture away from the drying frit. Such exhaust, if it contains particles, may be directed to a dust collector before being released to the workplace or ambient air.

This process is particularly energy frugal considering the heat used for drying the frit. (It is also energy frugal from the standpoint that the product is uniformly and properly quenched to promote easier grinding or milling at the subsequent processing stage).

The helical conveyor 30 raises the frit and delivers it to an elevated storage bin 40 from which it can be bagged or drummed as the case may be.

The entire quenching, cooling, drying and elevating process described herein saves manual labor as compared to prior art processes. For example, in one prior art process the molten stream is delivered to a large quenching bath having a basket positioned at the bottom thereof. Intermittently the basket must be removed full of quenched frit and the frit is delivered to a dryer such as a rotary dryer to further process the frit. In yet another process, a bucket elevator continuously removes the frit from a large quenching batch and delivers the quenched frit to the rotary dryer. There is, of course, yet another process in which quenching water is not used in direct contact with the molten glass but rather the molten glass is delivered to two water cooled rolls between which it is cooled. While in that process no drying at all is required. It has its known drawbacks relative to the water quenching process. Each of these processes is believed to require more labor in attending to the process itself or in maintaining the equipment.

Having thus described my invention in detail and with the particularity required by the Patent Laws, what is desired protected by Letters Patent is set forth in the following claims:

1. A method of quenching molten glass compositions and drying the quenched glass and elevating the quenched and dried glass to a storage hopper comprising the steps for
    (a) discharging a stream of molten glass composition and a stream of quenching liquid directly into a reciprocating inclined conveyor which is not immersed having deep side and end walls such that the lower end holds overflowing quenching liquid and the upper end of the conveyor does not,
    (b) reciprocating the conveyor continuously to agitate the quenching liquid and to move the quenched glass up along the conveyor until it emerges from the quenching liquid,
    (c) feeding the quenched glass emerging from the inclined conveyor at its upper end onto a second vibrating conveyor,
    (d) irradiating at least a portion of the second conveyor with infrared radiation sufficient to complete the drying of the quenched glass, and
    (e) feeding the quenched and dried glass emerging from the second conveyor into a storage hopper.

2. A system for quenching molten glass, drying the quenched glass and elevating the quenched and dried glass to a storage hopper comprising
    (a) an inclined reciprocating conveyor which is not immersed having deep side and lower end walls,
    (b) means for continuously replenishing the lower end of the conveyor with a quencher liquid,
    (c) a second conveyor for receiving the quenched glass from the reciprocating inclined conveyor, and
    (d) means for irradiating the second conveyor with infrared heat sufficient to complete drying.

3. A system according to claim 2 wherein said second conveyor is a helical plane vibrating conveyor.

4. Apparatus for quenching a stream of molten glass comprising
    an inclined reciprocating conveyor which is not immersed, said conveyor having deep side and lower end walls to hold a bath of quenching liquid, means for continuously replenishing the quenched liquid with cooler liquid whereby the liquid continuously overflows the lower end of the conveyor, means for providing a reciprocating motion to the conveyor to constantly agitate the quenching liquid and to move the quenched glass up out of the bath to the higher end of the conveyor.

* * * * *